United States Patent
Hu

(10) Patent No.: US 6,778,604 B1
(45) Date of Patent: Aug. 17, 2004

(54) MOTION COMPENSATION PERFORMANCE IMPROVEMENT BY REMOVING REDUNDANT EDGE INFORMATION

(75) Inventor: Shane Ching-Feng Hu, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 828 days.

(21) Appl. No.: 09/186,754

(22) Filed: Nov. 5, 1998

(51) Int. Cl.$^7$ .............................................. H04N 7/32
(52) U.S. Cl. .............................. 375/240.16; 375/240.29
(58) Field of Search ........................... 358/261.2, 261.3; 375/240.01–240.03, 240.08, 240.12–240.17, 240.2, 240.24, 240.29; 382/232, 236, 238, 251; H04N 7/24, 7/32

(56) References Cited

U.S. PATENT DOCUMENTS

| | | | | |
|---|---|---|---|---|
| 4,757,383 A | * | 7/1988 | Tanaka ..................... | 375/240.2 |
| 5,109,451 A | * | 4/1992 | Aono et al. ............. | 375/240.08 |
| 5,299,019 A | * | 3/1994 | Pack et al. ................ | 358/261.2 |
| 5,317,397 A | * | 5/1994 | Odaka et al. ........... | 375/240.15 |
| 5,361,105 A | * | 11/1994 | Iu .......................... | 375/240.16 |
| 5,542,008 A | * | 7/1996 | Sugahara et al. ....... | 375/240.12 |
| 5,748,247 A | * | 5/1998 | Hu ......................... | 375/240.14 |
| 6,064,450 A | * | 5/2000 | Canfield et al. ........ | 375/240.29 |

OTHER PUBLICATIONS

Girod, "Motion–Compensating Prediction with Fractional–Pel Accuracy", IEEE Transactions on Communications, vol. 41, No. 4, pp. 604–612, Apr. 1993.*

* cited by examiner

Primary Examiner—Richard Lee
(74) Attorney, Agent, or Firm—Francis I. Gray

(57) ABSTRACT

A motion compensation improvement for a compression encoder minimizes redundant edge information in a current image from a video input signal being input to the compression encoder. The current image is compared with a reference image from the video signal, which images may be the entire picture or a sub-region of the picture, to provide a spatial shift difference between the images, the spatial shift difference having an integer part and a high precision fractional part. From the high precision fractional part and specified constants for the compression encoder a shift value is calculated such that, when shifted, the current image is aligned with a quantizer motion vector grid in the compression encoder. The shift value is then used to resample the current image to make the desired shift prior to input to the compression encoder, thereby minimizing redundant edge information.

8 Claims, 1 Drawing Sheet

MOTION COMPENSATION PERFORMANCE IMPROVEMENT BY REMOVING REDUNDANT EDGE INFORMATION

BACKGROUND OF THE INVENTION

The present invention relates to video compression, and more particularly to a motion compensation performance improvement in motion compensated video coding by removing redundant edge information.

Motion compensation is well known for digital video compression. Its main use is to reduce the temporal redundancy of a video sequence. In practice the motion vector precision is often limited by compression standards to, for example, one-half pixel precision. Standard motion compensation techniques search for a minimum residue within the confinement of the limited fractional pixel precision. A shifted reference block is subtracted from a current block of video data to form a motion compensated residue. The block residue is quantized and entropy coded along with a motion vector that defines the amount of the shift for the reference block. A decoder performs inverse entropy coding to recover the quantized residue which in turn is inverse quantized and added to the shifted reference block to form the current block.

Bernd Girod, in his article entitled "Motion-Compensating Prediction with Fractional-pel Accuracy", IEEE Transactions on Communications, Vol. 41, No. 4 April 1993, studied the effect of fractional pixel accuracy on the efficiency of motion compensation prediction in conjunction with various spatial interpolation/prediction filters. Without exception the prediction error variance decreased monotonically with increasing motion compensation accuracy. He concluded that quarter pixel accuracy appears sufficient for broadcast television signals. However even with quarter pixel accuracy, the prediction error still contains a considerable amount of edge information. A compression system has to balance the cost of transmitting motion vectors against the amount of prediction error by choosing the appropriate accuracy for the motion vectors.

When the fractional pixel movement of the video data falls exactly onto a quantized motion vector grid, i.e., integer and/or half pixel movement, then the residue of the motion compensation is optimum both in the sense of minimizing residue values and visual distortion. However if the fractional pixel movement does not fall exactly onto the quantized motion vector grid, then the residue of the motion compensation contains redundant edge information. For example, shift an image by a small fraction, like a quarter pixel, and subtract the shifted image from the original image to form a difference image. Upon visual inspection the difference image contains mostly edge information. The edge information is similar to the original image and is redundant in the sense that human visual systems cannot easily tell the difference between the shifted and original images. Due to the fact that the residue of the motion compensation is often quantized heavily in order to achieve lower transmission rates, the redundant edge information is distorted. The resulting artifacts created are very visible if the situation persists for some short period of time. Such an often observed artifact in MPEG-2 encoded video is the shimmering of fine details when panning a scene.

What is desired is an improved motion compensation performance technique that minimizes redundant edge information even with the pixel precision limitation placed on the motion vector accuracy by a compression standard.

BRIEF SUMMARY OF THE INVENTION

Accordingly the present invention provides motion compensation performance improvement by minimizing redundant edge information. A current image from an input video signal, which may be either the entire picture or a sub-region of the picture, is compared with a prior reference image from the input video signal, which may correspondingly be either the entire picture or a sub-region of the picture, to determine a spatial shift value between the two images. The spatial shift value has an integer portion and a high precision fractional portion. The high precision fractional portion together with specified constants according to the particular compression standard is used to calculate a fractional shift value that aligns the current image with a quantized motion vector grid for the compression encoder. The current image is resampled using the fractional shift value before being input to the compression encoder, thus minimizing the redundant edge information.

The objects, advantages and other novel features of the present invention are apparent from the following detailed description when read in conjunction with the appended claims and attached drawing.

DETAILED DESCRIPTION OF THE INVENTION

Figure 1:
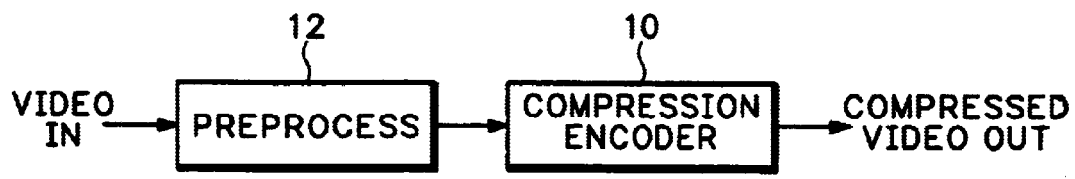
FIG. 1 is a block diagram view of a compression encoder using motion compensation performance improvement by minimizing redundant edge information according to the present invention.

Referring now to FIG. 1 at the input of a conventional compression encoder 10 is a preprocessor 12, the purpose of which is to shift a current image, which may be an entire picture or a sub-region of the picture, from an input video signal to align it so that fractional pixel movement of the video represented by the current image falls exactly onto a quantized motion vector grid, i.e., the movement is an integer or half pixel move with respect to a reference image for MPEG-2 video compression. The technique described here is most effective in eliminating fine picture detail artifacts when the image is being "panned", i.e., a camera is scanning a scene by moving from one side to another. For ease of understanding, simple one direction motion compensation is illustrated, corresponding to P pictures in MPEG-2 nomenclature. Bi-directional motion compensation, such as for B pictures in MPEG-2, uses the same technique. For motion vector accuracy specified in the MPEG-2 standard, up to one-half pixel precision is allowed.

Figure 2:
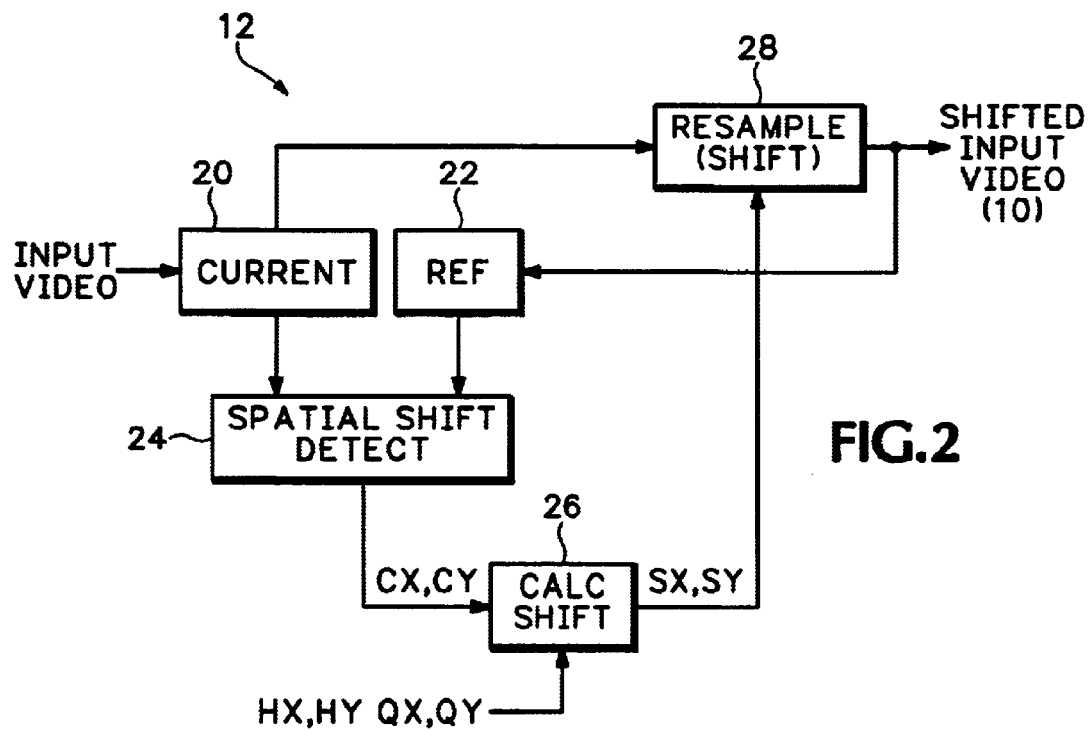
FIG. 2 is a functional block diagram of a preprocessor for the compression encoder according to the present invention.

As shown in FIG. 2 the preprocessor 12 stores a current image of data from the input video signal in a current store 20, with the prior corresponding current image in the current store being shifted and input to a reference store 22 as a reference image. A motion search is carried out to find a spatial shift between reference and current images with no constraint in precision. The data from the current and reference stores 20, 22 are input to a spatial shift detector 24, for example, one using a spatial alignment algorithm such as that described in co-pending U.S. patent application Ser. No. 09/186,761 entitled "High Precision Sub-Pixel Spatial Alignment of Digital Images" filed Nov. 5, 1998, by the same inventor, that is used to find the spatial shift between the images, the spatial shift having an integer portion and a high precision fractional portion. The high precision fractional portion is within the range of +/− ½ pixel of the integer portion. The high precision fractional portions may be denoted as CX and CY, respectively.

The maximum allowed motion vector precision unit is denoted as HX and HY, respectively. In MPEG-2 HX and HY are 0.5 and QX and QY, which represent one-half of the HX and HY values, are both 0.25 for this example. The CX and CY values from the spatial shift detector 24 are input to a shift calculator 26. In the shift calculator 26 the distance of CX and CY to the nearest motion vector sampling grid is calculated as follows:

If the absolute value of CX or CY is smaller or equal to QX or QY respectively, then SX=CX or SY=CY, else If CX is positive, SX=CX−HX, if CY is positive, SY=CY−HY, if CX is negative, SX=CX+HX, and if CY is negative, SY=CY+HY.

SX and SY represent the smallest amount of shift required to align the current image with the quantized motion vector grid. The resulting shift values SX and SY from the shift calculator 26 are input to a resampler 28 together with the current image from the current store 20. The current image is resampled by shifting the current image with the shift values of SX and SY, and the shifted current image is input to the reference store 22 as the reference image and to the encoder 10 instead of the original current image. By shifting the current image to fall on the quantized motion vector grid, the redundant edge information is minimized.

Thus the present invention provides a motion compensation performance improvement by shifting a current image of video data to be compressed by a fractional shift to align it with a quantizer motion vector grid, thereby minimizing redundant edge information.

What is claimed is:

1. A preprocessor for improving motion compensation performance in a compression encoder comprising:

means for determining a spatial shift between a current image from an input video signal and a reference image from the input video signal, the spatial shift having an integer value and a high precision fractional value;

means for calculating from the high precision fractional value and specified constants a fractional shift value; and means for resampling the current image according to the fractional shift value so that the current image aligns with a quantizer motion vector grid for the compression encoder, the resampled current image being input to the compression encoder.

2. A method of improving motion compensation performance in a compression encoder comprising the steps of:

determining a spatial shift between a current image from an input video signal and a reference image from the input video signal, the spatial shift having an integer value and a high precision fractional value;

calculating from the high precision fractional value and specified constants a fractional shift value; and resampling the current image according to the fractional shift value so that the current image aligns with a quantizer motion vector grid for the compression encoder, the resampled current image being input to the compression encoder.

3. The preprocessor as recited in claim 1 wherein the determining means comprises:

means for storing the current and reference images, the reference image being the resampled current image for a prior current image from the input video signal; and means for detecting the spatial shift between the current and reference images.

4. The preprocessor as recited in claim 1 wherein the calculating means comprises means for comparing an absolute value of the high precision fractional value relative to one-half of a maximum allowed motion vector precision unit so that if the absolute value is less than or equal to one-half of the maximum allowed motion vector precision unit the fractional shift value is set equal to the high precision fractional value, else if the high precision fractional value is positive the fractional shift value is set equal to the high precision fractional value less the maximum allowed motion vector precision unit and if the high precision fractional value is negative the fractional shift value is set equal to the high precision fractional value plus the maximum allowed motion vector precision unit.

5. The preprocessor as recited in claim 1 wherein the resampling means comprises means for shifting the current image with the fractional shift value to produce the resampled current image.

6. The method as recited in claim 2 wherein the determining step comprises the steps of:

storing the current and reference images, the reference image being the resampled current image for a prior current image from the input video signal; and detecting the spatial shift between the current and reference images.

7. The method as recited in claim 2 wherein the calculating step comprises the step of comparing an absolute value of the high precision fractional value relative to one-half of a maximum allowed motion vector precision unit so that if the absolute value is less than or equal to one-half of the maximum allowed motion vector precision unit the fractional shift value is set equal to the high precision fractional value, else if the high precision fractional value is positive the fractional shift value is set equal to the high precision fractional value less the maximum allowed motion vector precision unit and if the high precision fractional value is negative the fractional shift value is set equal to the high precision fractional value plus the maximum allowed motion vector precision unit.

8. The method as recited in claim 2 wherein the resampling step comprises the step of shifting the current image with the fractional shift value to produce the resampled current image.

* * * * *